(12) United States Patent
Dos Santos et al.

(10) Patent No.: US 11,057,269 B2
(45) Date of Patent: Jul. 6, 2021

(54) SYSTEM AND METHOD FOR CONFIGURING IED PROCESS BUS NETWORK SWITCHES FROM SUBSTATION TOPOLOGY SPECIFICATION

(71) Applicant: CENTRO DE INVESTIGAÇÃO EM ENERGIA REN—STATE GRID S A, Sacavém (PT)

(72) Inventors: André Quaresma Dos Santos, Lisbon (PT); Bruno Miguel Magalhães Soares, Baguim do Monte (PT); Yang Wei, Beijing (CN)

(73) Assignee: CENTRO DE INVESTIGAÇÃO EM ENERGIA REN-STATE GRID S, Sacavém (PT)

( * ) Notice: Subject to any disclaimer, the term of this patent is extended or adjusted under 35 U.S.C. 154(b) by 0 days.

(21) Appl. No.: 16/464,772

(22) PCT Filed: Nov. 29, 2017

(86) PCT No.: PCT/IB2017/057499
§ 371 (c)(1),
(2) Date: May 29, 2019

(87) PCT Pub. No.: WO2018/100509
PCT Pub. Date: Jun. 7, 2018

(65) Prior Publication Data
US 2019/0319836 A1      Oct. 17, 2019

(30) Foreign Application Priority Data

Nov. 29, 2016   (PT) .......................................... 109767

(51) Int. Cl.
*H04L 12/24*       (2006.01)
*H04L 12/721*      (2013.01)
(Continued)

(52) U.S. Cl.
CPC .......... *H04L 41/0806* (2013.01); *H04L 12/40* (2013.01); *H04L 41/145* (2013.01);
(Continued)

(58) Field of Classification Search
CPC ... H04L 41/0806; H04L 12/40; H04L 41/145; H04L 45/12; H04L 45/16; H04L 45/745;
(Continued)

(56) References Cited

U.S. PATENT DOCUMENTS

| 2005/0021622 A1* | 1/2005 | Cullen ................ H04L 67/2814 709/204 |
| 2010/0250622 A1* | 9/2010 | Hossenlop ......... G06K 9/00476 707/803 |

(Continued)

FOREIGN PATENT DOCUMENTS

| CN | 102368715 | 3/2012 |
| EP | 1976218 | 10/2008 |
| EP | 2916491 | 9/2015 |

OTHER PUBLICATIONS

McGhee et al, "Smart High Voltage Substation Based on IEC 61850 Process Bus and IEEE 1588 Time Synchronization," 2010 First IEEE International Conference on Smart Grid Communications, Gaithersburg, MD, 2010, pp. 489-49 (Year: 2010).*

(Continued)

*Primary Examiner* — Un C Cho
*Assistant Examiner* — Lalita W Pace
(74) *Attorney, Agent, or Firm* — Leason Ellis LLP

(57) ABSTRACT

Method and system arranged for configuring Intelligent Electronic Device, IED, process bus network switches from a substation specification according to IEC 61850 standard, said method comprising: calculating, from a substation topology file and from control function and substation bay library files, a Substation Specification Description file and (Continued)

substation traffic demand flow files comprising a GOOSE message profile subscription file and a Sampled Values message profile subscription file; generating destination MAC addresses; simulating the process bus communication network using said substation traffic demand flow files and process bus communication network topology, said topology comprising said process bus network switches, respective links and IED links; calculating the shortest path between each publisher IED and each subscriber IED; calculating a switch multicast filtering rule file, for each switch output port, comprising a multicast filter rule that allows the calculated shortest paths; translating the filtering rule file into a file acceptable by the switch.

18 Claims, 10 Drawing Sheets

(51) Int. Cl.
  *H04L 12/40* (2006.01)
  *H04L 12/761* (2013.01)
  *H04L 12/741* (2013.01)
  *H04L 12/813* (2013.01)
  *H04L 29/12* (2006.01)
(52) U.S. Cl.
  CPC .............. *H04L 45/12* (2013.01); *H04L 45/16* (2013.01); *H04L 45/745* (2013.01); *H04L 47/20* (2013.01); *H04L 61/2069* (2013.01); *H04L 2012/4026* (2013.01)
(58) Field of Classification Search
  CPC ................. H04L 47/20; H04L 61/2069; H04L 2012/4026; H04L 12/46; H04L 41/12
  See application file for complete search history.

(56) References Cited

U.S. PATENT DOCUMENTS

| | | | | |
|---|---|---|---|---|
| 2010/0256832 | A1* | 10/2010 | Kirrmann | H02H 7/261 700/293 |
| 2013/0117421 | A1* | 5/2013 | Wimmer | G06F 15/177 709/220 |
| 2014/0074276 | A1* | 3/2014 | Libuda | G05B 19/0426 700/112 |
| 2014/0303784 | A1* | 10/2014 | Obrist | H04L 12/4641 700/275 |
| 2014/0371941 | A1* | 12/2014 | Keller | H02J 13/00002 700/297 |
| 2015/0193558 | A1* | 7/2015 | Jang | G06Q 50/06 703/1 |
| 2017/0026291 | A1* | 1/2017 | Smith | H04L 45/28 |
| 2018/0090921 | A1* | 3/2018 | Li | H02J 13/0062 |

OTHER PUBLICATIONS

Ingram et al., "Multicast Traffic Filtering for Sampled Value Process Bus Networks," IECON 2011—37th Annual Conference of the IEEE Industrial Electronics Society, Melbourne, VIC, 2011, pp. 4710-4715 (Year: 2011).*
Sidhu et al., "Modelling and Simulation for Performance Evaluation of IEC61850-Based Substation Communication Systems," IEEE Transactions on Power Delivery, vol. 22, No. 3, Jul. 2007, pp. 1482-1489 (Year: 2007).*
Zhang et al., "Analytical Modeling of Traffic Flow in the Substation Communication Network," IEEE Transactions on Power Delivery, vol. 30, No. 5, Oct. 2015, pp. 2119-2127 (Year: 2015).*
Zhu et al., "IEC 61850-Based Information Model and Configuration Description of Communication Network in Substation Automation," IEEE Transactions on Power Delivery, vol. 29, No. 1, Feb. 2014, pp. 97-107 (Year: 2014).*
Xie et al., "Traffic Flow Calculation Method for Substation Communication Network," 2016 IEEE PES Innovative Smart Grid Technologies Conference Europe (ISGT-Europe), Ljubljana, 2016, pp. 1-6 (Year: 2016).*
Leon et al., "Simulation models for IEC 61850 communication in electrical substations using GOOSE and SMV time-critical messages," 2016 IEEE World Conference on Factory Communication Systems (WFCS), Aveiro, 2016, pp. 1-8 (Year: 2016).*
Sivanthi et al., "Systematic real-time traffic segmentation in substation automation systems," 2013 IEEE 18th Conference on Emerging Technologies & Factory Automation (ETFA), 2013, pp. 1-4 (Year: 2013).*
Zhang et al., "Modeling and Simulation of Data Flow for VLAN-Based Communication in Substations," in IEEE Systems Journal, vol. 11, No. 4, Dec. 2017, pp. 2467-2478 (Year: 2017).*
Ferrari et al., "Advanced networks for distributed measurement in substation automation systems," 2013 IEEE International Workshop on Applied Measurements for Power Systems (AMPS), 2013, pp. 108-113 (Year: 2013).*
Leal et al., "Software defined power substations: An architecture for network communications and its control plane," 2016 8th IEEE Latin-American Conference on Communications (LATINCOM), Medellin, 2016, pp. 1-6 (Year: 2016).*
International Search Report and Written Opinion issued in PCT/IB2017/057499, dated Mar. 5, 2018.
Sivanthi, Thanikesavan, and Otmar Goerlitz, "Systematic real-time traffic segmentation in substation automation systems." 2013 IEEE 18th Conference on Emerging Technologies & Factory Automation (ETFA). IEEE, 2013.
Ingalalli, Aravind, K. S. Silpa, and Rahul Gore. "SCD based IEC 61850 traffic estimation for substation automation networks." 2017 22nd IEEE International Conference on Emerging Technologies and Factory Automation (ETFA). IEEE, 2017.

* cited by examiner

```xml
<Table name="hm2AgentSwitchStaticMacFilteringEntry">
<Entry>
<Attribute name="hm2AgentSwitchStaticMacFilteringVlanId">1</Attribute>
<Attribute name="hm2AgentSwitchStaticMacFilteringAddress">01 0C CD 01 00 00</Attribute>
<Attribute name="hm2AgentSwitchStaticMacFilteringDestPortMask" convert="portlist">1/3</Attribute>
<Attribute name="hm2AgentSwitchStaticMacFilteringStatus">1</Attribute>
</Entry>
<Entry>
<Attribute name="hm2AgentSwitchStaticMacFilteringVlanId">1</Attribute>
<Attribute name="hm2AgentSwitchStaticMacFilteringAddress">01 0C CD 01 00 01</Attribute>
<Attribute name="hm2AgentSwitchStaticMacFilteringDestPortMask" convert="portlist">2/3</Attribute>
<Attribute name="hm2AgentSwitchStaticMacFilteringStatus">1</Attribute>
</Entry>
<Entry>
<Attribute name="hm2AgentSwitchStaticMacFilteringVlanId">1</Attribute>
<Attribute name="hm2AgentSwitchStaticMacFilteringAddress">01 0C CD 01 00 02</Attribute>
<Attribute name="hm2AgentSwitchStaticMacFilteringDestPortMask" convert="portlist">2/4</Attribute>
<Attribute name="hm2AgentSwitchStaticMacFilteringStatus">1</Attribute>
</Entry>
</Table>
```

Fig. 2

Table 1 – GOOSE Subscription file structure (.GOS)

| GoID | Subscriber IED | GOOSE Type | Destination MAC address | VLAN Id | VLAN Priority | T0 heartbeat interval |
|---|---|---|---|---|---|---|
| 201CBC1G1 | 201M1 | T.GOOSE_TypeA | 01-0C-CD-01-00-3F | 1234 | 7 | 5 |
| 201CBC1G1 | 201M1 | T.GOOSE_TypeA | 01-0C-CD-01-00-3F | 1234 | 7 | 5 |

FIG. 5

Table 2 – Sampled Value Subscription file structure (.SVS)

| SV Id | Subscriber IED | Type of SV message | Destination MAC address | VLAN Id | VLAN Priority |
|---|---|---|---|---|---|
| 201MUPAC1SV1 | 201PQBay | F12800S8I3U3 | 01-0C-CD-04-00-00 | 1234 | 2 |
| 202MUPAC1SV1 | 201CBC1 | F4000S1I3U3 | 01-0C-CD-04-01-00 | 1234 | 2 |

FIG. 6

Table 3 – Multicast Filtering Rule file structure (.MFR)

| Switch Id | Switch port number | Destination MAC address |
|---|---|---|
| 10 | 1 | 01-0C-CD-04-00-00 |
| 10 | 2 | 01-0C-CD-04-00-00 |
| 10 | 2 | 01-0C-CD-04-01-00 |

FIG. 7

Table 4 – MAC address attribution file structure (.MAC)

| Publisher IED | IEC 61850 profile | GOOSE/SV Id | Multicast MAC address |
|---|---|---|---|
| 201CBC1 | GOOSE | 201CBC1G1 | 01-0C-CD-01-00-3F |
| 201MUPAC1 | Sampled Values | 201MUPAC1SV1 | 01-0C-CD-01-01-3F |

FIG. 8

Table 5 – List of publish messages and corresponding Multicast Mac address.

| IED | GoID or SV Id | Destination MAC address |
|---|---|---|
| IED 1 | IED1G1 | 01-0C-CD-01-00-3F |
| IED 1 | IED1SV1 | 01-0C-CD-01-01-3F |
| IED 2 | IED2G1 | 01-0C-CD-01-00-3G |
| IED 2 | IED2SV1 | 01-0C-CD-01-01-3G |

FIG. 9

Table 6 – MAC address attribution file (.MAC)

| Publisher IED | IEC 61850 profile | GOOSE/SV Id | Multicast MAC address |
|---|---|---|---|
| IED1 | GOOSE | IED1G1 | 01-0C-CD-01-00-3F |
| IED1 | Sampled Values | IED1SV1 | 01-0C-CD-01-01-3F |
| IED2 | GOOSE | IED2G1 | 01-0C-CD-01-00-3G |
| IED2 | Sampled Values | IED2SV1 | 01-0C-CD-01-01-3G |

FIG. 10

Table 7 – GOOSE Subscription file (.GOS)

| GoID | Subscriber IED | GOOSE Type | Destination MAC address | VLAN Id | VLAN Priority | T0 heartbeat interval |
|---|---|---|---|---|---|---|
| IED1G1 | IED 3 | Type A | 01-0C-CD-01-00-3F | 1234 | 7 | 5 |
| IED2G1 | IED 4 | Type B | 01-0C-CD-01-00-3G | 1234 | 7 | 5 |

FIG. 11

Table 8 – Sampled Value Subscription file (.SVS)

| Sampled Value Id | Subscriber IED | Type of SV message | Destination MAC address | VLAN Id | VLAN Priority |
|---|---|---|---|---|---|
| IED1SV1 | IED 4 | F12800S8I3U3 | 01-0C-CD-01-01-3F | 1234 | 7 |
| IED2SV1 | IED 3 | F4000S1I3U3 | 01-0C-CD-01-01-3G | 1234 | 7 |

FIG. 12

Table 9 – Multicast Filtering Rule file (.MFR) for switch 1

| Switch Id | Switch port number | Destination MAC address |
|---|---|---|
| 1 | 2 | 01-0C-CD-01-00-3G |
| 1 | 2 | 01-0C-CD-01-01-3G |
| 1 | 3 | 01-0C-CD-01-00-3F |

FIG. 13

Table 10 – Multicast Filtering Rule file (.MFR) for switch 2

| Switch Id | Switch port number | Destination MAC address |
|---|---|---|
| 2 | 1 | 01-0C-CD-01-01-3G |
| 2 | 2 | 01-0C-CD-01-00-3F |
| 2 | 2 | 01-0C-CD-01-01-3G |

FIG. 14

SYSTEM AND METHOD FOR CONFIGURING IED PROCESS BUS NETWORK SWITCHES FROM SUBSTATION TOPOLOGY SPECIFICATION

CROSS-REFERENCE TO RELATED APPLICATIONS

This application is a U.S. National Stage Application under 35 U.S.C. § 371 of International Patent Application No. PCT/IB2017/057499, filed Nov. 29, 2017, which claims priority to Portugal Application No. 109767, filed Nov. 29, 2016, which are hereby incorporated by reference in their respective entireties.

TECHNICAL FIELD

The present disclosure relates to system and method for configuring switches, and optionally IEDs (Intelligent Electronic Devices), of a process bus network for IEDs (Intelligent Electronic Devices) from a substation specification, including a substation topology specification, according to the IEC 61850 standard.

BACKGROUND

The IEC 61850 standard is a standard for vendor-agnostic engineering of the configuration of Intelligent Electronic Devices (IEDs) for electrical substation automation systems to be able to communicate with each other. IEC 61850, which is hereby incorporated by reference in full, is a part of the International Electrotechnical Commission's (IEC) Technical Committee 57 (TC57) reference architecture for electric power systems and can be obtained for example from http://www.iec.ch. The same applies to IEC 61869-9. The standards referred are referred in the versions:

IEC 61850-8-1, "Communication Networks and systems for power utility automation—Part 8-1: Specific communication service mapping (SCSM)—Mapping to MMS (ISO 9506-1 and ISO 9506-2) and to ISO/IEC 8802-3", Edition 2.0, June 2011;

IEC 61850-9-2, Communication networks and systems for power utility automation—Part 9-2: Specific communication service mapping (SCSM)—Sampled values over ISO/IEC 8802-3", Edition 2.0, September 2011;

IEC 61869-9, "Instrument transformers Part 9: Digital interface for instrument transformers", Edition 1.0, April 2016;

i.e. the IEC 61850 standard is as IEC 61850-8-1 and IEC 61850-9-2 both in their version 2.0, and the IEC 61869-9 standard is in its version 1.0

The abstract data models defined in IEC 61850 can be mapped to a number of protocols. Current mappings in the standard include GOOSE (Generic Object Oriented System Event). These protocols can run over TCP/IP networks or substation LANs using high speed switched Ethernet to obtain the necessary response times for a safe and efficient operation of a substation. In particular, the IEC 61850 standard describes critical Ethernet traffic profiles used by Protection Automation and Control (PAC) devices, Intelligent Electronic Devices (IEDs), for the purpose of control and protection of power systems. These IED devices are typically located in substations, generation power plants and industrial sites.

Two critical Ethernet traffic profiles are defined: the Generic Object Oriented Substation Event, GOOSE message profile from the IEC 61850-8 standard, and the Sampled Values, (SV) message profile from the IEC 61869-9. The first is especially used for transmitting time critical information, such as open or close commands to the High Voltage Circuit Breakers, while the second is normally used to transmit current and voltage analogue measurements.

Critical Ethernet traffic is transmitted on a dedicated Ethernet network named Process Bus. Process Bus communication relies heavily on multicast transmission at the Ethernet protocol layer by means of destination Media Access Control address, MAC address, included in the Ethernet packets. This destination MAC address is a multicast MAC address and therefore, Process Bus communication is very inefficient since each message is forwarded to all IED interfaces, including those that are not message subscribers.

Traffic partitioning in the Process Bus plays an important role, due to the very strong real-time requirements for GOOSE and Sampled Values traffic. One of the most effective ways to achieve traffic partitioning is by means of static multicast filtering at Ethernet switches connecting the various devices together on a network.

When using multicast filtering, each switch only allows outbound traffic from a specific port if the corresponding destination MAC address is part of a filtering rule listed on its internal Multicast Filtering White List, MFWL, otherwise the traffic is blocked. Multicast filtering becomes crucial to reduce Process Bus bandwidth traffic and the IED communication processing requirements, when receiving too many multicast messages.

When applying traffic partitioning in the Process Bus, by means of multicast filtering, the communication network performance achieves a highly deterministic behaviour, a result of all traffic flow in each Ethernet link being perfectly described, concerning flow rate and traffic profile. This information is used at the switch level to inspect incoming packets and define and apply Traffic Policing Rules based on priority reclassification and/or packets drop out.

The correct operation of the IED depends very much on the configuration of Multicast Filtering White Lists in the switches, therefore it becomes very important to use a robust and error free configuration process.

Setting up an Ethernet communication network with multicast filtering at the Ethernet switches is a complex task. This is due to the need to produce a large number of MFWL (one list per switch port), to apply to the Ethernets switches that are part of the Process Bus network.

If the process of setting multicast filtering and all required MFWL is done manually in each switch, it would be a very toilsome, time consuming and with high probability of mistake. It is not possible to configure it using the Substation Configuration Language (.SCL) files, described in the IEC 61850 standard, because these files do not include the communication network description, i.e. topology and link bandwidth.

Although .SCL files includes the description of all critical messages that are exchanged between PAC devices, the tools that used to produce such files neither contain the Process Bus network communication topology, i.e. number of switches and how they are linked to each other and to the existing IED, nor are able to bridge the multicast filtering configuration and the destination MAC address information included in the .SCL file.

Nevertheless, the SCD file can be used to establish publisher/subscriber traffic profiles IEDs pairs, although this is only available at system deployment stage, as real IEDs are required for its generation. It is a drawback since the process bus network design and specification is preferably made prior to system deployment.

Document CN102368715 discloses an IEC-61850 protocol gateway-based realization equipment for centralized network management of exchangers. The realization equipment comprises a simple network management protocol (SNMP) server, an SNMP client, an IEC-61850 client, an IEC-61850 server and a protocol gateway that is formed by mapping of management information between the SNMP client and the IEC-61850 server. The SNMP server is used for providing a management information node of an exchange for an SNMP client protocol data message; the SNMP client obtains management information of an exchanger SNMP management information base (MIB) according to the SNMP client protocol data message; after the protocol gateway obtains the management information, the management information is mapped on an IEC-61850 management information model of the IEC-61850 server and thus, a data source of the IEC-61850 server is formed; and the IEC-61850 client is communicated with the IEC-61850 server by an IEC-61850 standard, so that the exchanger is controlled and managed.

Document CN102368715 however requires a permanent SNMP server for providing networking management of network exchangers.

Document EP1976218 is concerned with substation automation systems (SAS), in particular with a method and system for configuring an International Electrotechnical Commission (IEC) 61850 standard-compliant Intelligent Electronic Device (IED). Proxy IED is a NCC gateway device enhanced for converting data between non-IEC 61850 and IEC 61850 communication protocols. Proxy IED is configured, based on a set of mappings, which are coded in the SA configuration description (SCD) file. The SCD file includes mappings for data conversion between non-IEC 61850 and IEC 61850 communication protocols.

Document EP1976218 however uses SCD file information for creating network mapping thus not taking into account the Process bus communication network topology in said mapping.

These facts are disclosed in order to illustrate the technical problem addressed by the present disclosure.

GENERAL DESCRIPTION

The disclosed general configuration process work flow is able to specify to configure the critical Ethernet traffic profiles GOOSE and Sampled Values settings, both in the publishers and subscribers IEDs, produce all MFWL to configure the switches for performing traffic partition by means of Ethernet Filtering and to define Traffic Policing Rules applicable at switch level. Furthermore the disclosed general configuration process work flow reduces the required human intervention during all this process.

It is disclosed a method for obtaining an Intelligent Electronic Device, IED, process bus network switch filtering rule configuration file from a substation specification according to the IEC 61850 standard, comprising the steps of:
calculating, from a substation topology file, from a control function library file and a substation bay library file, a Substation Specification Description file and substation traffic demand flow files comprising a GOOSE message profile subscription file and a Sampled Values message profile subscription file;
generating destination MAC addresses;
simulating the process bus communication network using said substation traffic demand flow files and the process bus communication network topology, said topology comprising said process bus network switches, respective links and IED links;
calculating the shortest path between each publisher IED and each subscriber IED;
calculating a switch multicast filtering rule file, for each switch output port, comprising a multicast MAC address filter rule that allows the calculated shortest paths.

It is also disclosed a method for configuring Intelligent Electronic Device, IED, process bus network switches from a substation specification according to the IEC 61850 standard, comprising the steps of:
calculating, from a substation topology file, from protection, automation and control functions library and substation bay library files, a Substation Specification Description file and substation traffic demand flow files comprising a GOOSE message profile subscription file and a Sampled Values message profile subscription file;
generating destination MAC addresses;
simulating the process bus communication network using said substation traffic demand flow files and the process bus communication network topology, said topology comprising said process bus network switches, respective links and IED links;
calculating the shortest path between each publisher IED and each subscriber IED;
calculating a switch multicast filtering rule file, for each switch output port, comprising a multicast filter rule that allows the calculated shortest paths;
translating the switch multicast filtering rule file into a file that follows the structured accepted by the network switch, comprising an algorithm to perform this translation for every network switch model of every switch manufacturer;
defining traffic policing rules for each network switch port, comprising the calculation of used bandwidth in each network switch port per communication type.

An embodiment comprises translating the switch multicast filtering rule file into a file format acceptable by each process bus network switch.

An embodiment comprises a step to perform said translation for each process bus network switch model/manufacturer combination.

In an embodiment, the control function library comprises protection, automation and control functions.

An embodiment of the disclosure, wherein simulating the process bus communication network further comprises simulating the bandwidth utilization and traffic flow profile in each communication link, comprises the step of calculating for each switch output port the bandwidth used, per traffic type (GOOSE and Sampled Values) both in steady state and during an event when there is an expected increase in used bandwidth. With the results and some parameters defined by user, a traffic policing rule or rules are defined, in particular said traffic policing rules comprising priority reclassification policing rule and/or packet drop out policing rule.

In an embodiment, the protection, automation and control functions library and substation bay library files comprise templates of standardized primary equipment names, PAC functions, logical nodes, and in particular corresponding data objects, according to the IEC 61850, virtual IED and corresponding critical traffic profiles publish and subscribe demands.

In an embodiment, calculating a Substation Specification Description file comprises instantiating substation bays, instantiating substation IEDs, instantiating substation PAC functions and instantiating substation critical traffic profiles according to the IEC 61850 standard, wherein said instantiating processes comprises specifying, for said substation topology, all the PAC functions and corresponding IEDs that are required per substation bay according to said templates.

In an embodiment, generating destination MAC addresses comprises the steps of:
  using said substation topology, said instantiated bays, and said instantiated IEDs;
  instantiating the GOOSE and Sampled Values traffic according to IEC 61850 and IEC 61869-9 respectively;
  calculating traffic destinations of said instantiated critical traffic profiles;
  providing an available MAC address, for each calculated traffic destination, within a MAC address group corresponding to IEC 61850 Traffic Flow.

An embodiment comprises the step of configuring said switches using said calculated switch multicast filtering rule file in a said format compatible to be imported in the network switches.

In an embodiment, any file of said files is a Comma Separated Value (CSV) file or any file combination of said files are CSV files. Alternatively, an alternative embodiment uses XML.

In an embodiment, the GOOSE message profile subscription file comprises GOOSE publisher/subscriber pair and corresponding traffic parameters, comprises for each record of said file:
  an id of the published GOOSE profile;
  a name of the subscriber IED;
  the type of GOOSE message—type corresponds to a message with a defined packet size in bytes;
  the destination MAC address;
  a VLAN Id;
  a VLAN Priority;
  a T0 heartbeat interval;
  according to the IEC 61850 standard.

In an embodiment, the Sampled Values message profile subscription file comprises Sampled Values publisher/subscriber pair and the corresponding traffic parameters, comprises for each record of said file:
  an id of the published Sampled Values;
  a name of the subscriber IED;
  the type of Sampled Values message;
  the destination MAC address;
  a VLAN Id;
  a VLAN Priority.

In an embodiment, the switch multicast filtering rule file comprises for each record of said file: switch Id;
  switch port number;
  multicast MAC address.

In an embodiment, the generating of destination MAC addresses comprises obtaining a MAC address attribution file which comprises for each record of said file:
  name of publishing IED;
  IEC 61850 traffic profile to which the MAC value belongs to;
  an id of the published GOOSE or Sampled Value profile;
  multicast MAC address.

It is also disclosed a method for configuring a substation IED process bus network comprising the method for obtaining an IED process bus network switch filtering rule configuration file of any of the described embodiments, further comprising the step of configuring said switches using said calculated switch multicast filtering rule file.

An embodiment comprises the step of configuring said IEDs with the generated destination MAC addresses using the Substation Configuration Description file.

An embodiment comprises the step of importing the MAC attribution file in a system configuration tool, and further comprising the step of configuring said IEDs with the generated destination MAC addresses using the Substation Configuration Description file exported by the system configuration tool.

It is also disclosed a system for configuring Intelligent Electronic Device, IED, process bus network switches from a substation specification according to the IEC 61850 standard, comprising a data processor and respective memory, said data processor being arranged to carry out any of the disclosed methods.

Non-transitory storage media including program instructions for implementing a system for configuring Intelligent Electronic Device, IED, process bus network switches from a substation specification according to the IEC 61850 standard, the program instructions including instructions executable to carry out any of the disclosed methods.

BRIEF DESCRIPTION OF THE DRAWINGS

The following figures provide preferred embodiments for illustrating the description and should not be seen as limiting the scope of invention.

FIG. 2: Example of an embodiment of .MFRS file following a specific manufacturer format after translation from a .MFR file.

FIG. 5: Presentation of Table 1 having a GOOSE subscription file structure (.GOS).

FIG. 6: Presentation of Table 2 having a sampled value subscription file structure (.SVS).

FIG. 7: Presentation of Table 3 having a multicast filtering rule file structure (.MFR).

FIG. 8: Presentation of Table 4 having a MAC address attribution file structure (.MAC).

FIG. 9: Presentation of Table 5 having a List of publish messages and corresponding multicast mac address.

FIG. 10: Presentation of Table 6 having a MAC address attribution file (.MAC).

FIG. 11: Presentation of Table 7 having a GOOSE subscription file (.GOS).

FIG. 12: Presentation of Table 8 having a sampled value subscription file (.SVS).

FIG. 13: Presentation of Table 9 having a multicast filtering rule file (.MFR) for switch 1.

FIG. 14: Presentation of Table 10 having a multicast filtering rule file (.MFR) for switch 2.

DETAILED DESCRIPTION

Figure 1A:
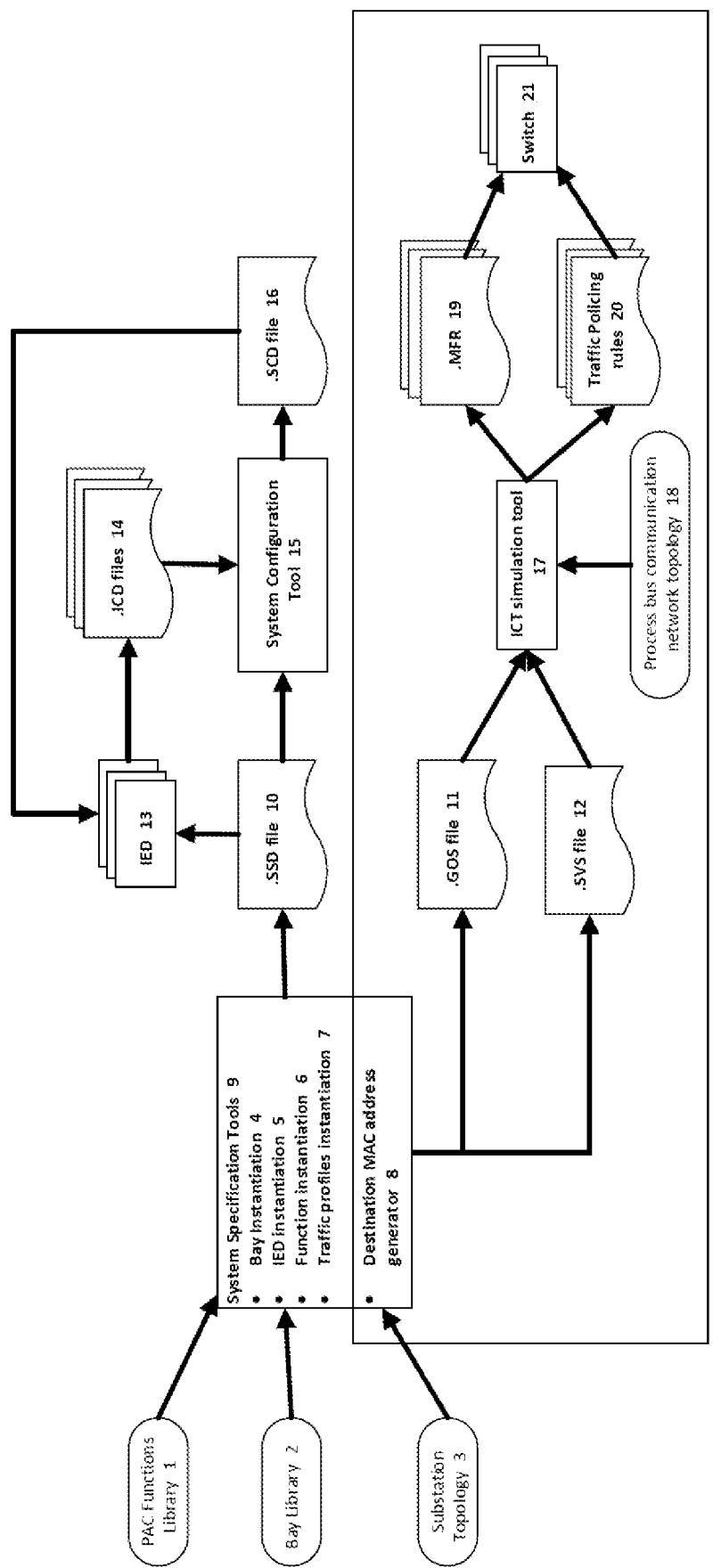
FIG. 1A: Schematic representation of an embodiment of the general configuration process work flow according to the disclosure.

The general configuration process work flow starts with the definition of protection, automation and control function libraries 1 and substation bay library 2, see FIG. 1A. These libraries contain templates of substation bays and functions used in the General Configuration Process Work Flow. The templates comprehend standardized primary equipment names, PAC functions, logical nodes according to the IEC 61850, virtual IED and corresponding critical traffic profiles publish and subscribe demands.

The process also requires the information of the substation topology of interest 3, to be combined with the existing libraries, instantiate the substation bays 4, instantiate the substation IEDs 5, instantiate the substation PAC functions 6 and instantiate the substation critical traffic profiles 7. The instantiation process consists in specifying for the substation topology of interest, all PAC functions and corresponding IED that are required per substation bay according to these templates. The critical traffic profile instantiation considers the use of a destination MAC address generator 8. The generator assumes the substation topology, instantiated bays and IED and instantiates the GOOSE and Sampled Values traffic, by checking the traffic destination and giving an available MAC address accordingly with the MAC address group that the Traffic Flow belongs to, as recommended in the IEC 61850 standard.

The instantiations may be performed by a single software tool, herewith named the System Specification Tool 9, or by several tools that are combined together for the same purpose. For example, the bays, IED and PAC function instantiation may be achieved by the same software tool, but the traffic profiles instantiation may be achieved by a distinct software tool.

The outcome of the System Specification Tool is the Substation Specification Description file (.SSD) 10, and the Substation Traffic Demand Flow files. The first, according to the IEC 61850 standard, specifies the data models used for IED purchase. The latter lists all critical traffic, GOOSE and SV, that will exist in the substation of interest by using two files: the GOOSE Subscription file (.GOS) 11 and the SV Subscription file (.SVS) 12.

In the GOOSE subscription file each line describes a publisher/subscriber pair and the traffic parameters. The file is a CSV file structured in columns with the following information:
Goose Id: The (encoded) name of the published profile
Subscriber IED: The (encoded) name of the subscriber IED
Type of GOOSE message—a type corresponds to a message with a defined packet size in bytes.
Destination MAC address
VLAN Id
VLAN Priority
T0 heartbeat interval
An example of the .GOS file content is presented in Table 1.

In the SV subscription (.SVS) file each line describes a publisher/subscriber pair and the corresponding traffic parameters. The file is a CSV file structured in columns with the following information:
Sampled Value Id: The (encoded) name of the published Sampled values
Subscriber IED: The (encoded) name of the subscriber IED
Type of SV message
Destination MAC address
VLAN Id
VLAN Priority
An example of the .SVS file content is presented in Table 2.

Once the IEDs 13 that will be deployed in the substation have their data model according to the .SSD file, they generate a IED Configuration Description file (.ICD) 14 used by a System Configuration Tool 15 to make the mapping between the logical nodes, specified in each instantiated IED, and the existing nodes in the real IED data model.

The System Configuration Tool generates the final configuration file needed to properly configure all IEDs 13 inside the substation, i.e. the Substation Configuration Description file (.SCD) 16. This file includes the configuration of the entire substation and is loaded into each IED.

As regards the configuration of the multicast filtering rules in the substation switches, this is made using the .GOS and .SVS file (11, 12). The files are used in an Information and Communications Technology (ICT) simulation tool 17 able to simulate all existing traffic profiles in the Process Bus. The tool requires a description of the network communication topology 18, i.e. number of switches, how they are linked to each other and to the existing IEDs.

The simulation is complete, in terms of connections, because during an initialization stage all publishers initially broadcast their services and each subscriber requests the desired services, thus obtaining a complete characterization of the active connections during this simulation stage of substation initialization.

Following the shortest path between each publisher and subscriber IED, the tool is able to define the multicast filter rules at switch port outputs and produce the require MFWL for each switch and for each port. Finally these rules are included in the Multicast Filtering Rules (.MFR) files 19 which are assigned to each switch in the LAN for configuration. The file is a CSV file structured in columns with the following information:
Switch Id
Switch port number
Multicast MAC address
An example of the .MFR file content is presented in Table 3.

The ICT simulation tool is also able to characterize the expected bandwidth utilization and traffic profile in each communication link, which is used to define Traffic Policing Rules 20 at each switch port based on priority reclassification and/or packets drop out.

Finally, the substation switches 21 are configured according to the generated .MFR files and the defined Traffic Policing Rules.

Figure 1B:
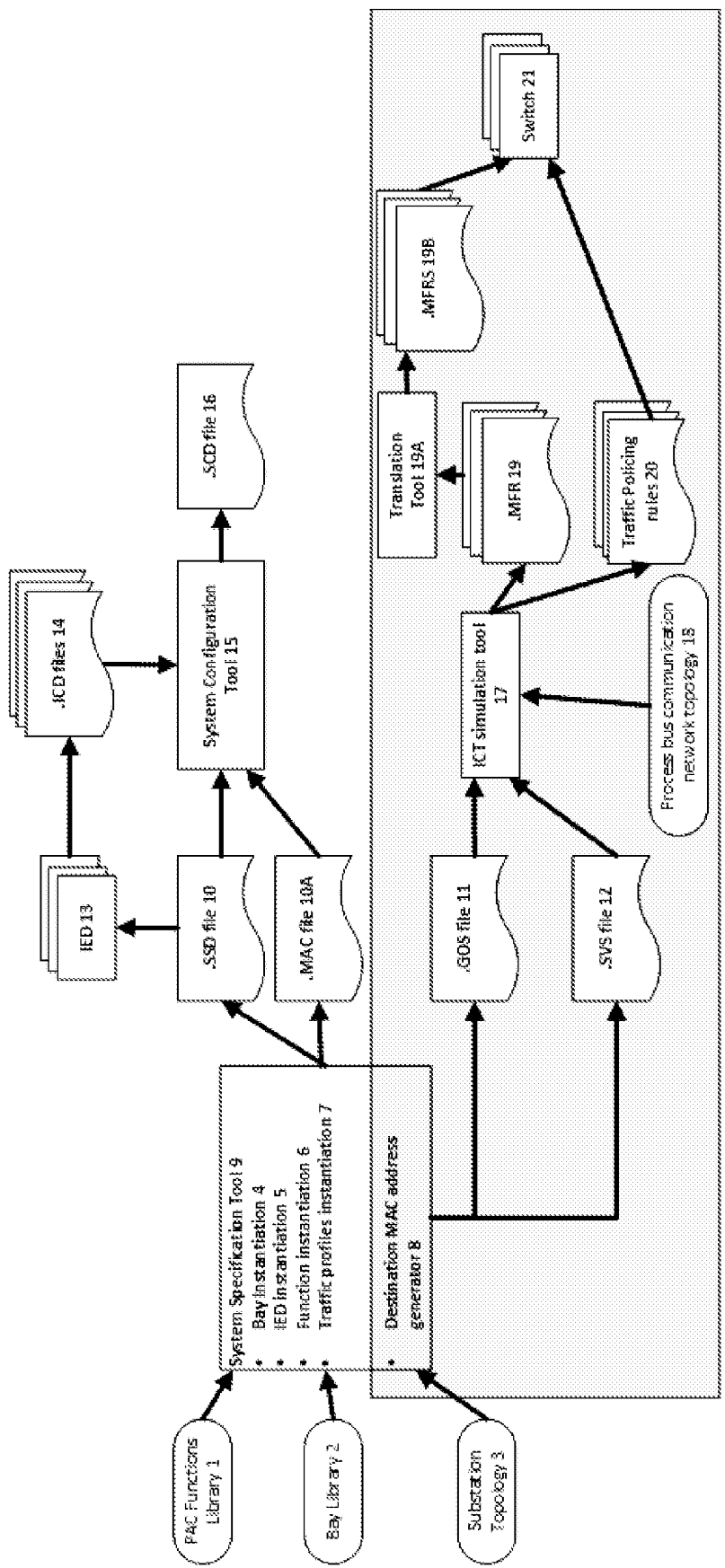
FIG. 1B: Schematic representation of a more specific alternative of the embodiment of the general configuration process work flow according to the disclosure.

A more specific alternative of the embodiment of the workflow is also considered in FIG. 1B. This alternative follows the previously described configuration process workflow, but adds some files that can enhance the process. The first change is the introduction of the the MAC address attribution file (.MAC) 10A which is a file that lists the MAC addresses attributed to each GOOSE or SV profile.

In the MAC address attribution file each line describes the MAC address given by the destination MAC address generator 8 to each one of the GOOSE and Sampled Values profiles. The file is a CSV file structured in columns with the following information:
name of publishing IED;
IEC 61850 traffic profile to which the MAC value belongs to;
an id of the published GOOSE or Sampled Value profile;
multicast MAC address.
An example of the .MAC file content is presented in Table 4.

It is also foreseen in the alternative embodiment of the workflow a translation tool 19A, that adopts the .MFR 19 file into a file in a format compatible with each one of network switch model of every switch manufacturer: the multicast filtering rules for switch (.MFRS) 19B.

The format of .MFRS file varies from manufacturer to manufacturer. An example of said file is presented in FIG. 2.

At the end a coherent configuration between the PAC devices and Process Bus switches is achieved.

Advantageously, the simulation can further be used as a normal substation simulation, simply by being continued after said initialization stage. For example, traffic and loads can be simulated and the project can be fine-tuned by the human operator. As the computer workload of initializing the simulation and the human workload of setting up the simulation environment has already been carried out, this is practically a "free" run of the simulation setup.

Additionally, the simulation can further be used to statistically characterize critical network traffic delays per profile, during steady state conditions and during the occurrence of a disturbance causing IEDs to generate traffic according to their configurations.

The simulation stage is suitably exact such that the generated switch fabric is also correspondingly exact, which ensures that the connections permitted between network devices will be necessary and sufficient for the operation of the substation.

It is noted that the format of any one or more of the mentioned files can be CSV or any other suitable format like a binary file, XML file, JSON file, among others, as CSV is one of several possibilities.

Examples of Preferred Embodiments

Consider a PAC system composed of 4 IEDs, in which two of them are publishers, IED 1 and 2, and two are subscribers, IED 3 and 4. All communications are to be in VLAN 1234 with priority 7.

Figure 3:
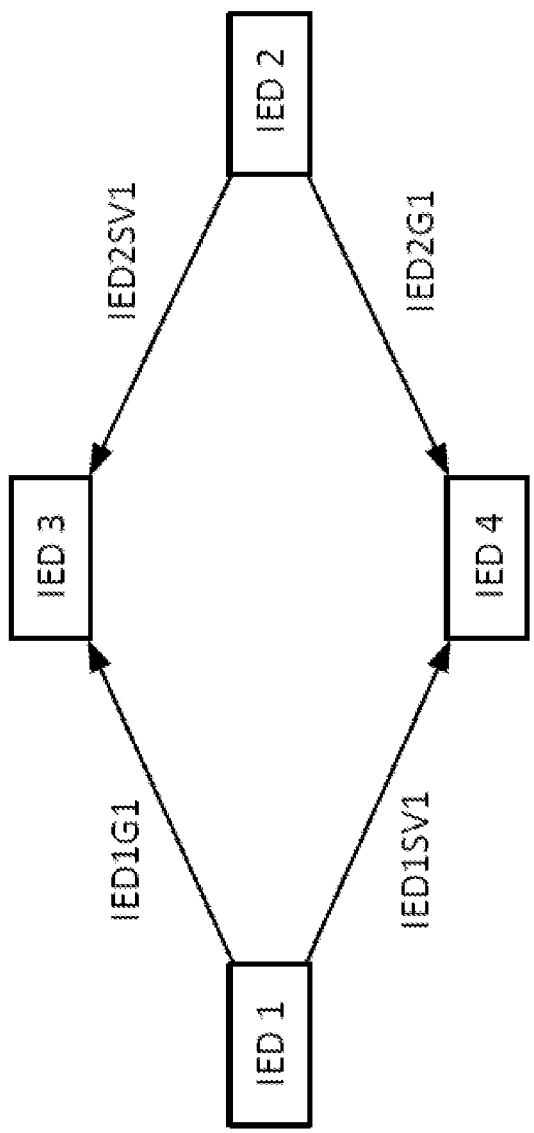
FIG. 3: Schematic representation of an embodiment of IED critical traffic profiles publish and subscribe demands according to the disclosure.

The instantiation process of this system, made by the System Specification Tool, produced traffic demand flow between IEDs described in FIG. 3 and the corresponding list of published messages presented in Table 5. The destination MAC addresses shown in Table 4 are outputs of the destination MAC address generator.

The system configuration tool is used to configure the IEDs using the produced .SSD and .MAC files and the following process steps (10, 11, 14, 15, 16 and 17). The tool also produces the .MAC, .GOS and .SVS files presented in Tables 6, 7 and 8.

Figure 4:
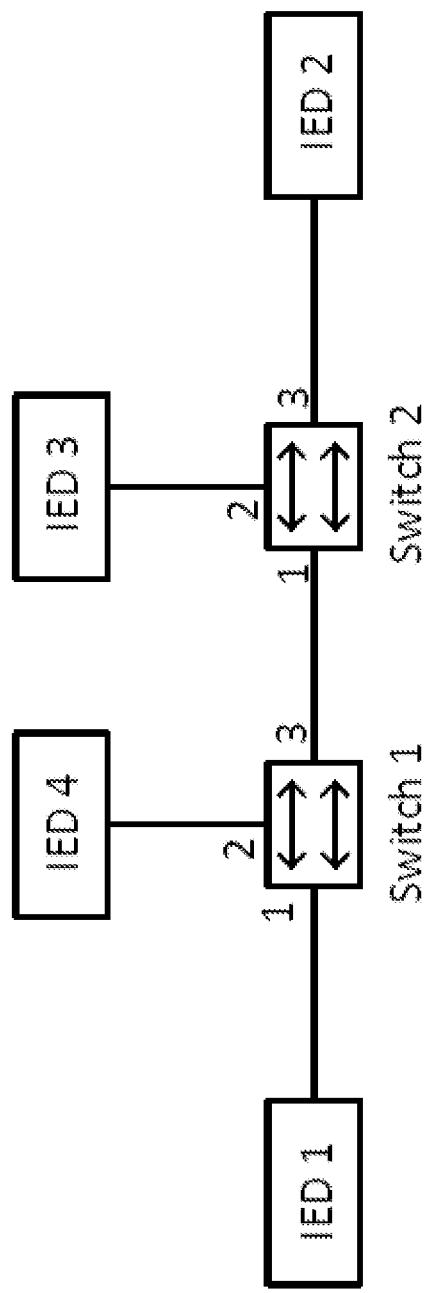
FIG. 4: Schematic representation of an embodiment of IED process bus network switches according to the disclosure.

Consider the process bus network topology applied to connect the four IEDs and presented in FIG. 4. This network comprehends two switches with 3 ports each. The ICT simulation tool uses this topology, combined with the .GOS and .SVS files, to generate the corresponding .MFR files for each switch, Tables 9 and 10. The .MFR files are finally used to configure switches 1 and 2.

The IEDs and the process bus switches are now configured coherently.

The term "comprising" whenever used in this document is intended to indicate the presence of stated features, integers, steps, components, but not to preclude the presence or addition of one or more other features, integers, steps, components or groups thereof.

Flow diagrams of particular embodiments of the presently disclosed methods are depicted in figures. The flow diagrams do not depict any particular means, rather the flow diagrams illustrate the functional information one of ordinary skill in the art requires to perform said methods required in accordance with the present disclosure.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof.

The above described embodiments are combinable. The following claims further set out particular embodiments of the disclosure.

The invention claimed is:

1. A method for obtaining an Intelligent Electronic Device ("IED") process bus communication network switch filtering rule configuration file, for a process bus communication network comprising switches and having a topology for connecting IEDs, wherein said IEDs comprise publisher IEDs and subscriber IEDs, wherein said switches include one or more switch output ports from a substation specification according to an IEC 61850 standard, comprising the steps of:

calculating, from a substation topology file, from a control function library file and a substation bay library file, a Substation Specification Description file and substation traffic demand flow files comprising a GOOSE message profile subscription file and a Sampled Values message profile subscription file;

generating destination MAC addresses;

simulating the process bus communication network using said substation traffic demand flow files and the process bus communication network topology, said topology comprising said process bus communication network switches, communication links of the process bus communication network switches and communication links of the IEDs;

calculating a shortest path between each publisher IED and each subscriber IED; and calculating a switch multicast filtering rule file, for each switch output port, comprising a multicast MAC address filter rule that allows the calculated shortest paths.

2. The method of claim 1, wherein simulating the process bus communication network further comprises simulating a bandwidth utilization and traffic profile in each communication link of the process bus communication network switches and of the IEDs to the process bus communication network, further comprising a step of calculating one or more traffic policing rules for each switch output port, in particular said one or more traffic policing rules comprising a priority reclassification policing rule and/or a packet drop out policing rule.

3. The method of claim 1, further comprising translating the switch multicast filtering rule file into a file format acceptable by each process bus network switch.

4. The method of claim 3, further comprising performing said translation for each process bus network switch model/manufacturer combination.

5. The method of claim 1, wherein the control function library comprises protection, automation and control functions.

6. The method of claim 1, wherein the control function and substation bay library files comprise templates of standardized primary equipment names, PAC functions, logical nodes, each according to the IEC 61850 standard, virtual IED and corresponding critical traffic profiles publish and subscribe demands.

7. The method of claim 6, wherein calculating a Substation Specification Description file comprises instantiating substation bays, instantiating substation IEDs, instantiating substation PAC functions and instantiating substation critical traffic profiles, wherein said substation bays, said substation IEDs, said substation PAC functions and said substation critical traffic profiles are defined according to the IEC 61850 standard, wherein said instantiating processes comprises specifying, for said substation topology file, all the PAC functions and corresponding IEDs that are required per substation bay according to said templates.

8. The method of claim 7, wherein generating destination MAC addresses comprises the steps of:
   using said substation topology file, said instantiated substation bays, and said instantiated substation IEDs;
   instantiating GOOSE and Sampled Values traffic, for GOOSE and Sampled Values traffic as defined according to the IEC 61850 standard;
   calculating traffic destinations of said instantiated substation critical traffic profiles; and
   providing an available MAC address, for each calculated traffic destination, within a MAC address group corresponding to a Traffic Flow as defined according to the IEC 61850 standard.

9. The method of claim 1, wherein any one file of said files is a CSV file or any file combination of said files are CSV files.

10. The method of claim 1, wherein any one file of said files is a XML file or any file combination of said files comprises XML files.

11. The method of claim 1, wherein the GOOSE message profile subscription file comprises GOOSE publisher/subscriber pair and corresponding traffic parameters, comprising for each record of said file, as defined according to the IEC 61850 standard:
   an id of a published GOOSE profile;
   a name of the subscriber IED;
   a type of GOOSE message;
   a destination MAC address;
   a VLAN Id;
   a VLAN Priority; and
   a T0 heartbeat interval.

12. The method of claim 1, wherein the Sampled Values message profile subscription file comprises Sampled Values publisher/subscriber pair and corresponding traffic parameters, comprising for each record of said file:
   an id of a published Sampled Values profile;
   a name of the subscriber IED;
   a type of Sampled Values message;
   a destination MAC address;
   a VLAN Id; and
   a VLAN Priority.

13. The method of claim 1, wherein the switch multicast filtering rule file comprises for each record of said file:
   switch Id;
   switch port number; and
   multicast MAC address.

14. The method of claim 8, wherein the generating of destination MAC addresses comprises obtaining a MAC address attribution file, which comprises for each record of said file:
   a multicast MAC address value;
   a name of publishing IED;
   a traffic profile, as defined according to the IEC 61850 standard, to which the multicast MAC address value belongs to; and
   an id of a published GOOSE profile or of a Sampled Value profile.

15. The method of claim 1, further comprising the step of configuring said switches using said calculated switch multicast filtering rule file.

16. The method of claim 15, further comprising the step of importing a MAC attribution file in a system configuration tool.

17. A system for configuring Intelligent Electronic Device, IED, process bus network switches from a substation specification according to the IEC 61850 standard, comprising a data processor and respective memory, said data processor being arranged to carry out the method of claim 1.

18. A non-transitory storage media including program instructions for implementing a system for configuring Intelligent Electronic Device, IED, process bus network switches from a substation specification according to the IEC 61850 standard, the program instructions including instructions executable to carry out the method of claim 1.

* * * * *